Feb. 20, 1940.  A. C. MOSER  2,191,395
MILK PAIL STRAINER
Filed Sept. 27, 1937
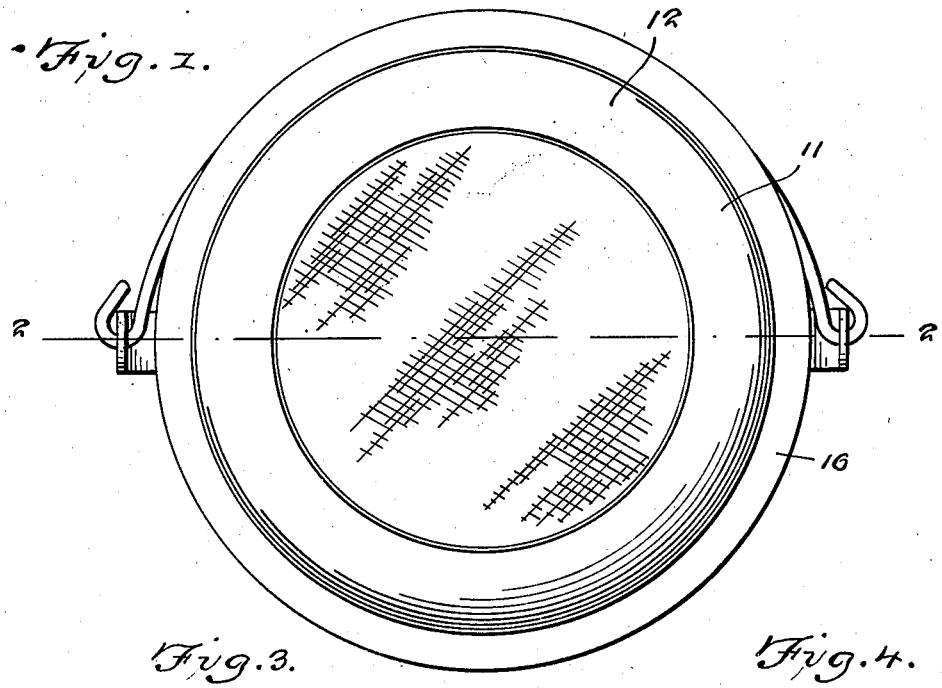
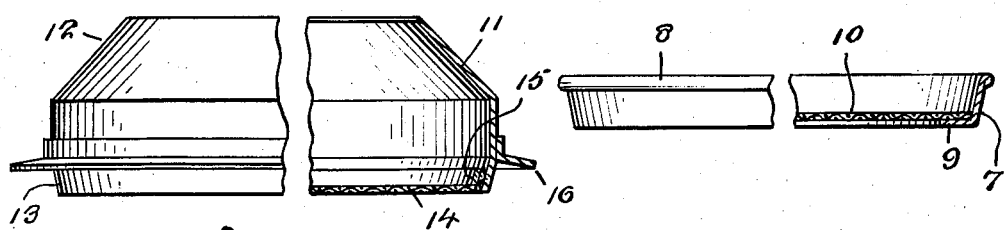
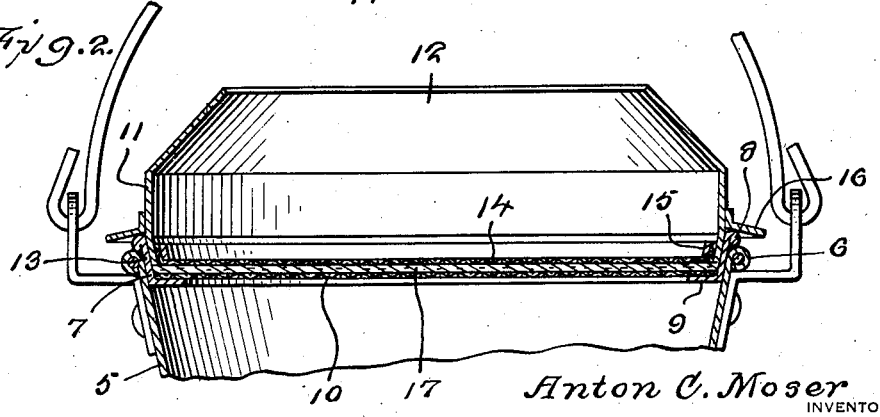
Anton C. Moser
INVENTOR
BY Victor J. Evans & Co.
ATTORNEYS Patented Feb. 20, 1940

2,191,395

UNITED STATES PATENT OFFICE 2,191,395

MILK PAIL STRAINER

Anton C. Moser, Moose Lake, Minn.

Application September 27, 1937, Serial No. 165,986

1 Claim. (Cl. 210—159)

My invention relates to improvements in pails and more particularly to milk or dairy pails having strainers.

One of the principal objects of my invention is to provide a milk pail equipped with means for straining the milk during the milking operation as it is introduced into the pail.

Another object of my invention is to provide a device of the above described character wherein the parts may be readily disassembled for replacing the filtering element.

A further object of my invention is to provide a device of the above described character which is simple in construction, efficient in operation and economical in manufacture.

Other objects and advantages will be apparent from the following description, appended claim and annexed drawing.

Referring to the drawing wherein like reference characters designate like parts throughout the several views:

Fig. 1 is a top plan view of my invention.

Fig. 2 is a detail sectional view of the upper section of the pail taken on a line 2—2 of Fig. 1.

Fig. 3 is a detail view, partly in section, of the shell.

Fig. 4 is a detail view, partly in section, illustrating the member for supporting the filtering element.

In practicing my invention, I employ a milk pail 5 of ordinary construction formed with a rolled rim 6. Within the rim 6 there is positioned a filter supporting member 7 formed with an upper lip 8 for engagement with the rim 6 and an inwardly offset circumferential flange 9. Secured on the flange 9 is a mesh bottom 10 preferably constructed of wire mesh. Supported on the member 7 is a shell 11 having opened top and bottom ends 12 and 13 respectively. The top end is inclined inwardly and upwardly while the bottom end has secured thereto a mesh bottom 14, preferably constructed of wire mesh, by means of a clamping ring 15 as clearly illustrated in Fig. 2 of the drawing. Secured on the outer periphery of the shell between the bottom and top ends thereof there is a circumferentially extending flange member 16 engaging the lip 8 of the member 7. Interposed between the bottoms 10 and 14 is a filtering element 17, preferably constructed of fibrous material.

The periphery of the member 7 is tapered to conform with the taper of the side of the pail and likewise the bottom end 13 of the shell 11 is tapered to conform with the taper of the member 7. The lip 8 of the member 7 engages the rim 6 of the pail to limit the downward movement of the member when being inserted and serves to maintain the member in supported position at the top of the pail. The flange 16 of the shell coacts with the lip 8 of the member 7 to support the shell upon the member 7, a coacting relation of the parts effecting a nesting thereof and maintaining the filtering element between the bottoms 10 and 14. During a milking operation, the inclined top of the shell 11 serves to prevent splashing of the milk without the shell as the jets engage the bottom 14 and filtering element 17.

From the foregoing it will be apparent that when the member 7, shell 11 and filtering element 17 are assembled together and inserted within the rim of a pail, a simple and effective means is had to filter milk before it is introduced into the pail.

It is to be distinctly understood that while I have illustrated and described my invention in connection with milk pails, the same may be utilized in connection with other types of containers and for other operations where it is desired to filter the contents before introducing the same into containers.

Having described my invention, what I claim is:

A strainer construction of that character adapted for association with a pail having a rolled rim, comprising, a filter supporting member having a tapered side wall terminating in a rolled rim adapted to contactually overlie the rolled rim of the pail and coacting with the rolled rim of the pail to support said member within said pail and in appressed condition therewith, said member having an apertured bottom, a screen covering said bottom, a shell mounted within said member and having a flange contactually overlying the rim of said member for maintaining said shell spaced relative to said screen, a filtering element interposed between said shell and said screen, a second screen overlying said filtering element, and a ring detachably securing said second screen within said shell and coacting therewith to maintain said filtering element in adjusted position on said first mentioned screen.

ANTON C. MOSER.